US009930252B2

(12) United States Patent
Djugash

(10) Patent No.: US 9,930,252 B2
(45) Date of Patent: Mar. 27, 2018

(54) METHODS, SYSTEMS AND ROBOTS FOR PROCESSING OMNI-DIRECTIONAL IMAGE DATA

(71) Applicant: Toyota Motor Engineering & Manufacturing North America, Inc., Erlanger, KY (US)

(72) Inventor: Joseph Maria Angelo Djugash, San Jose, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 773 days.

(21) Appl. No.: 13/706,760

(22) Filed: Dec. 6, 2012

(65) Prior Publication Data

US 2014/0160229 A1 Jun. 12, 2014

(51) Int. Cl.
| | |
|---|---|
| *H04N 7/00* | (2011.01) |
| *H04N 5/232* | (2006.01) |
| *G06K 9/00* | (2006.01) |
| *G06K 9/20* | (2006.01) |
| *G06K 9/46* | (2006.01) |
| *G06T 7/73* | (2017.01) |

(52) U.S. Cl.
CPC ..... *H04N 5/23238* (2013.01); *G06K 9/00664* (2013.01); *G06K 9/209* (2013.01); *G06K 9/4671* (2013.01); *G06T 7/73* (2017.01); *G06K 2009/2045* (2013.01); *G06T 2207/20021* (2013.01); *Y10S 901/46* (2013.01)

(58) Field of Classification Search
CPC .... G02B 13/06; G03B 37/02; G06K 9/00208; G06T 7/0093

USPC ..................... 348/36; 382/384; 386/224, 227
See application file for complete search history.

(56) References Cited

U.S. PATENT DOCUMENTS

| | | | |
|---|---|---|---|
| 7,123,777 | B2 | 10/2006 | Rondinelli et al. |
| 8,150,650 | B2 | 4/2012 | Goncalves et al. |
| 8,204,643 | B2 | 6/2012 | Nakano |
| 8,249,302 | B2 | 8/2012 | Ramalingam et al. |
| 2008/0232678 | A1* | 9/2008 | Yoon et al. ................... 382/153 |
| 2010/0205142 | A1* | 8/2010 | Feulner ................ G06F 19/321 |
| | | | 707/602 |

(Continued)

OTHER PUBLICATIONS

Analysis and Design of Panoramic Stereo Vision Using Equi-Angular Pixel Cameras; Mark Ollis et al.; The Robotics Institute; Carnegie Mellon University; Jan. 1999.

(Continued)

*Primary Examiner* — Helen Shibru
(74) *Attorney, Agent, or Firm* — Dinsmore & Shohl LLP

(57) ABSTRACT

Methods, systems, and robots for processing omni-directional image data are disclosed. A method includes receiving omni-directional image data representative of a panoramic field of view and segmenting, by one or more processors, the omni-directional image data into a plurality of image slices. Each image slice of the plurality of image slices is representative of at least a portion of the panoramic field of view of the omni-directional image data. The method further includes calculating a slice descriptor for each image slice of the plurality of image slices and generating a current sequence of slice descriptors. The current sequence of slice descriptors includes the calculated slice descriptor for each image slice of the plurality of image slices.

20 Claims, 4 Drawing Sheets

(56) References Cited

U.S. PATENT DOCUMENTS

| | | |
|---|---|---|
| 2010/0235080 A1 | 9/2010 | Faenger et al. |
| 2011/0035054 A1 | 2/2011 | Gal et al. |
| 2011/0115909 A1 | 5/2011 | Sternberg et al. |
| 2013/0114705 A1* | 5/2013 | Chen .............. H04N 19/00569 375/240.12 |
| 2013/0188738 A1* | 7/2013 | Hannuksela ........... H04N 19/46 375/240.25 |

OTHER PUBLICATIONS

Adapting a Real-Time Monocular Visual SLAM from Conventional to Omnidirectional Cameras; Daniel Gutierrez, et al.; http://robots.unizar.es/data/documentos/article_omnivis.pdf.

Gross, et al., "Vision-based Monte Carlo Self-localization for a Mobile Service Robot Acting as Shopping Assistant in a Home Store", Proceedings of the 2002 IEEE/RSJ/ Intl. Conference on Intelligent Robots and Systems, EPFL, Lausanne, Switzerland, Oct. 2002, pp. 256-262.

Gonzalez, et al., "Rover localization in natural environments by indexing panoramic images", Proceedings of the 2002 IEEE, International Conference on Robotics & Automation, Washington, DC, May 2002, pp. 1365-1370.

Courbon, et al., "Efficient Hierarchical Localization Method in an Omnidirectional images Memory", 2008 IEEE International Conference on Robotics and Automation, Pasadena, CA USA, May 19-23, 2008, pp. 13-18.

European Search Report and Opinion, dated Mar. 8, 2016 filed in European Application No. 13195415.8.

\* cited by examiner

METHODS, SYSTEMS AND ROBOTS FOR PROCESSING OMNI-DIRECTIONAL IMAGE DATA

TECHNICAL FIELD

The present disclosure generally relates to image processing and, more particularly, methods, systems, and robots for processing omni-directional image data.

BACKGROUND

Omni-directional image data may be acquired from an omni-directional image capture device and utilized for a number of purposes. For example, a robot or mobile device may include an omni-directional image capture device that utilizes captured omni-directional image data to estimate a position or orientation of the robot or mobile device. As the resolution of omni-directional image data increases and the need to quickly process omni-directional image data increases, it may be desirable to compactly and efficiently process omni-directional image data.

Accordingly, a need exists for methods, systems, and robots for processing omni-directional image data.

SUMMARY

In one embodiment, a method for processing omni-directional image data includes receiving omni-directional image data representative of a panoramic field of view and segmenting, by one or more processors, the omni-directional image data into a plurality of image slices. Each image slice of the plurality of image slices is representative of at least a portion of the panoramic field of view of the omni-directional image data. The method further includes calculating a slice descriptor for each image slice of the plurality of image slices and generating a current sequence of slice descriptors. The current sequence of slice descriptors includes the calculated slice descriptor for each image slice of the plurality of image slices.

In another embodiment, an omni-directional image data processing system includes one or more processors, a non-transitory memory component communicatively coupled to the one or more processors, and machine readable instructions stored in the non-transitory memory component. When executed by the one or more processors, the machine readable instructions cause the omni-directional image data processing system to receive omni-directional image data representative of a panoramic field of view and segment the omni-directional image data into a plurality of image slices. Each image slice of the plurality of image slices is representative of at least a portion of the panoramic field of view of the omni-directional image data. When executed by the one or more processors, the machine readable instructions further cause the omni-directional image data processing system to calculate a slice descriptor for each image slice of the plurality of image slices and generate a current sequence of slice descriptors. The current sequence of slice descriptors includes the calculated slice descriptor for each image slice of the plurality of image slices.

In yet another embodiment, a robot includes one or more processors, one or more image capture devices communicatively coupled to the one or more processors, a non-transitory memory component communicatively coupled to the one or more processors, and machine readable instructions stored in the non-transitory memory component. When executed by the one or more processors, the machine readable instructions cause the robot to receive omni-directional image data from the one or more image capture devices. The omni-directional image data is representative of a panoramic field of view. When executed by the one or more processors, the machine readable instructions further cause the robot to segment the omni-directional image data into a plurality of image slices. Each image slice of the plurality of image slices is representative of at least a portion of the panoramic field of view of the omni-directional image data. When executed by the one or more processors, the machine readable instructions further cause the robot to calculate a slice descriptor for each image slice of the plurality of image slices and generate a current sequence of slice descriptors. The current sequence of slice descriptors includes the calculated slice descriptor for each image slice of the plurality of image slices.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to methods, systems, and robots for processing omni-directional image data. The embodiments described herein may segment an omni-directional image into a plurality of image slices, calculate a slice descriptor for each slice, and generate a sequence of slice descriptors to represent the omni-directional image data. Representing an omni-directional image as a sequence of slice descriptors may provide for scalable, compact, and efficient representations of omni-directional image data. Such scalable, compact, and efficient representations of omni-directional image data may facilitate fast and efficient estimation of position or orientation that only involves comparing a current sequence of slice descriptors with a reference sequence of slice descriptors. The embodiments described herein may be employed by robots or other devices that utilize omni-directional image capture devices for position estimation or orientation estimation. For example, a robot operating within a space may be equipped with one or more omni-directional image capture devices to acquire omni-directional image data of the environment in which the robot operates. Such a robot may utilize the omni-directional image data to estimate a position or orientation of the robot within the environment. The embodiments described herein may improve the data storage and processing requirements of such position estimation or orientation estimation. Various embodiments of methods, systems, and robots for processing omni-directional image data are described in detail below.

Figure 1:
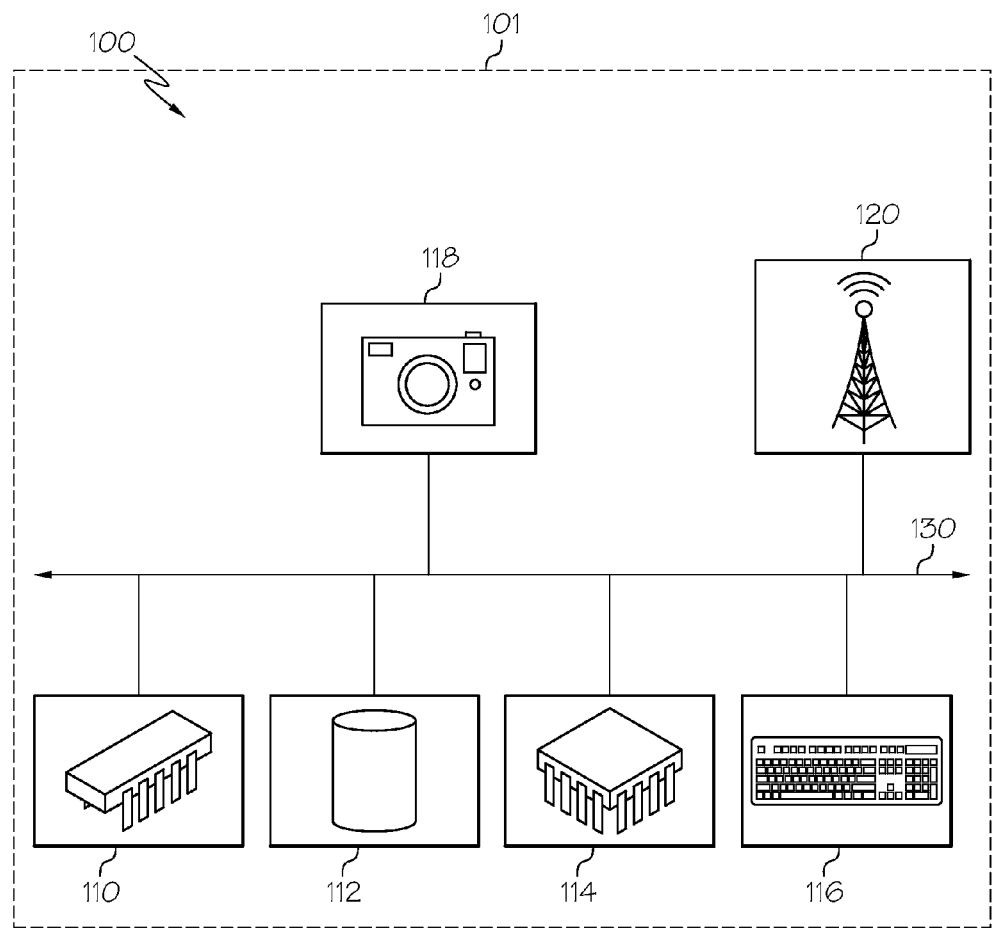
FIG. 1 schematically depicts a robot including an omni-directional image data processing system, according to one or more embodiments described and illustrated herein.

Referring initially to FIG. 1, a robot 101 including an omni-directional image data processing system 100 is schematically depicted. In the embodiment depicted in FIG. 1, the omni-directional image data processing system 100 may be utilized to estimate a position or orientation of the robot 101, as will be described below. As an initial matter, it should be noted that while the omni-directional image data processing system 100 is depicted as coupled to the robot 101, in other embodiments, the omni-directional image data processing system 100 may not be coupled to a robot, such as in embodiments in which the omni-directional image data processing system 100 is embedded within a mobile device (e.g., smartphone, laptop computer, etc.) or exists in isolation.

The omni-directional image data processing system 100 includes one or more processors 110, a data storage device 112, a non-transitory memory component 114, optional input/output hardware 116, one or more image capture devices 118, and an optional communications module 120. In some embodiments, the one or more processors 110, the data storage device 112, and the non-transitory memory component 114 may be provided in a single integrated circuit (e.g., a system on a chip). In some embodiments, the one or more processors 110, the data storage device 112, and the non-transitory memory component 114 may be provided as separate integrated circuits.

Each of the one or more processors 110 is configured to communicate with electrically coupled components, and may be configured as any commercially available or customized processor suitable for the particular applications that the omni-directional image data processing system 100 is designed to operate. Each of the one or more processors 110 may be any device capable of executing machine readable instructions. Accordingly, each of the one or more processors 110 may be a controller, an integrated circuit, a microchip, a computer, or any other computing device. The one or more processors 110 are coupled to a communication path 130 that provides signal interconnectivity between various modules of the omni-directional image data processing system 100. The communication path 130 may communicatively couple any number of processors with one another, and allow the modules coupled to the communication path 130 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 130 may be formed from any medium that is capable of transmitting a signal such as, for example, conductive wires, conductive traces, optical waveguides, or the like. Moreover, the communication path 130 may be formed from a combination of mediums capable of transmitting signals. In one embodiment, the communication path 130 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The non-transitory memory component 114 may be coupled to the communication path 130. The non-transitory memory component 114 may include a volatile and/or nonvolatile computer-readable storage medium, such as RAM, ROM, flash memories, hard drives, or any medium capable of storing machine readable instructions such that the machine readable instructions can be accessed by the one or more processors 110. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the non-transitory memory component 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The data storage device 112 may also be configured as volatile and/or nonvolatile computer-readable storage medium, and may be configured to store representations of omni-directional images, as described hereinbelow. In one embodiment, the data storage device 112 is a separate data storage component from the non-transitory memory component 114. In another embodiment, the data storage device 112 and the non-transitory memory component 114 are provided as a single data storage component (i.e., the databases and set of instructions are stored in a single data storage component). In yet another embodiment, the data storage device 112 may be remote from the omni-directional image data processing system 100, and remotely accessed via the optional communications module 120.

The one or more image capture devices 118 may be coupled to the communication path 130. The one or more image capture devices 118 may receive control signals from the one or more processors 110 to acquire omni-directional image data of a surrounding physical environment, and to then send the acquired omni-directional image data to the one or more processors 110 and/or the data storage device 112 for storage and/or processing. The one or more image capture devices 118 may be directly connected to the data storage device 112, or, in an alternative embodiment, include dedicated memory devices (e.g., flash memory) that are accessible to the one or more processors 110 for retrieval.

Each of the one or more image capture devices 118 may have any resolution and may be configured to detect radiation in any desirable wavelength band, such as an ultraviolet wavelength band, a near-ultraviolet wavelength band, a visible light wavelength band, a near infrared wavelength band, or an infrared wavelength band. In some embodiments, at least one of the one or more image capture devices 118 may be a standard definition (e.g., 640 pixels×480 pixels) camera. In some embodiments, at least one of the one or more image capture devices 118 may be a high definition camera (e.g., 1440 pixels×1024 pixels or 1280 pixels×1024). In some embodiments, at least one of the one or more image capture devices 118 may have a resolution other than 640 pixels×480 pixels, 1440 pixels×1024 pixels, or 1280 pixels×1024. The one or more image capture devices 118 may provide omni-directional image data in the form of digital video and/or one or more digital photographs.

In some embodiments, the one or more image capture devices 118 may include an omni-directional imaging system configured to capture a panoramic field of view. In some embodiments, a "panoramic field of view" may be a three hundred sixty degree field of view. In some embodiments, a "panoramic field of view" may be less than a three hundred sixty degree field of view, such as a field of view that is greater than one hundred eighty degrees and less than three hundred sixty degrees.

In some embodiments, the omni-directional imaging system includes a camera that rotates about an axis of rotation, which is configured to capture a panoramic field of view upon a full rotation about the axis of rotation. In some embodiments, the omni-directional imaging system includes a camera with a fish-eye lens positioned in the optical path of the camera. In some embodiments, the omni-directional imaging system includes a plurality of partial field of view cameras, in which each partial field of view camera is configured to capture less than a panoramic view, but the plurality of partial field of view cameras collectively capture the panoramic field of view. In some embodiments, the omni-directional imaging system includes a camera and one or more mirrors positioned in the optical path of the camera (e.g., one or more planar mirrors and/or one or more curved mirrors), such that the camera images a panoramic field of view.

The optional communications module 120 may be coupled to the communication path 130 and may be configured as a wireless communications circuit such that the omni-directional image data processing system 100 may communicate with external systems and devices. The optional communications module 120 may be configured to communicate over any type of wireless communications protocol, such as, but not limited to, satellite communication, WiFi, WiMax, cellular (e.g., 3G, 4G, LTE, etc.), and proprietary wireless communication protocol.

Figure 2:
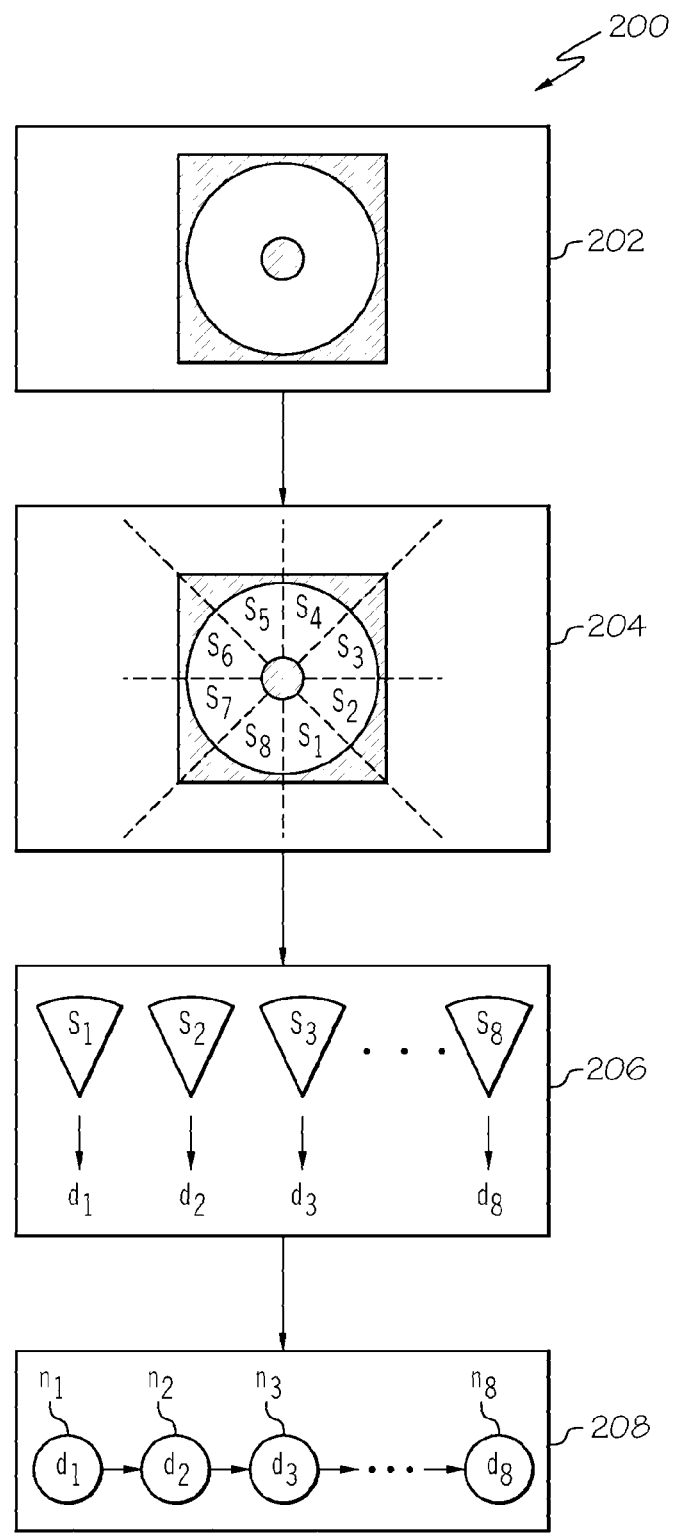
FIG. 2 schematically depicts a flowchart of a method of processing an omni-directional image, according to one or more embodiments described and illustrated herein.

Referring now to FIG. 2, a flowchart of a method 200 of processing an omni-directional image is schematically depicted. In some embodiments, the method 200 may be implemented as logic within the machine readable instructions that, when executed by the one or more processors 110, automatically process omni-directional image data. It is noted that, while the method 200 depicts a specific sequence, additional embodiments of the present disclosure are not limited to any particular sequence.

Referring now to FIGS. 1-2, at block 202 the omni-directional image data processing system 100 receives omni-directional image data representative of a panoramic field of view. In some embodiments, the omni-directional image data processing system 100 operates within a physical environment and is configured to acquire omni-directional image data, and to then send the acquired omni-directional image data of the physical environment to the one or more processors 110 and/or the data storage device 112 for storage and/or processing. In some embodiments, the omni-directional image data processing system 100 may receive omni-directional image data from a source external to the omni-directional image data processing system 100, such as via communications module 120. The acquired omni-directional image data may be in the form of digital video and/or one or more digital photographs.

Still referring to FIGS. 1-2, at block 204, the machine readable instructions stored in the non-transitory memory component 114, when executed by the one or more processors 110, cause the omni-directional image data processing system 100 to segment the omni-directional image data into a plurality of image slices. In the embodiment depicted in FIG. 2, the received omni-directional image is segmented into eight slices ($S_1$, $S_2$, $S_3$, $S_4$, $S_5$, $S_6$, $S_7$, and $S_8$). In some embodiments, the omni-direction image may be segmented into any number of slices. In some embodiments, the number of slices may be between 8 and 36. However, it should be understood that the number of slices may be less than 8 or greater than 36.

Each of the plurality of slices is representative of at least a portion of the panoramic field of view of the omni-directional image data or the partially panoramic field of view of the omni-directional image data. In some embodiments, the plurality of image slices includes a middle image slice (e.g., slice $S_2$ in FIG. 2), a preceding image slice (e.g., slice $S_1$ in FIG. 2), and a subsequent image slice (e.g., slice $S_3$ in FIG. 2), such that a field of view of the middle image slice (e.g., slice $S_2$ in FIG. 2) is adjacent to or overlaps a preceding field of view of the preceding image slice (e.g., slice $S_1$ in FIG. 2) and the middle field of view of the middle image slice (e.g., slice $S_2$ in FIG. 2) is adjacent to or overlaps a subsequent view of the subsequent image slice (e.g., slice $S_3$ in FIG. 2).

In some embodiments, each image slice of the plurality of image slices is representative of an equal portion of the panoramic field of view of the omni-directional image data and the collective fields of view of the plurality of image slices is the same as the panoramic field of view of the omni-directional image data. For example, in the embodiment depicted in FIG. 2, each of the eight slices captures an eighth of the full panoramic view of the omni-directional image data and the collective field of view of the eight image slices is the same as the panoramic field of view of the omni-directional image data received at block 202. In some embodiments, the field of view of a first slice of the plurality of views may be greater than a field of view of a second slice of the plurality of slices. In some embodiments, the collective fields of view of the plurality of slices may be smaller than the full panoramic field of view. In some embodiments, the field of views of neighboring slices may overlap.

Still referring to FIGS. 1-2, at block 206, the machine readable instructions stored in the non-transitory memory component 114, when executed by the one or more processors 110, cause the omni-directional image data processing system 100 to calculate a slice descriptor for each image slice of the plurality of image slices. As used herein, "slice descriptor" refers to s description of the visual features (e.g., color, texture, shape, motion, etc.) of the image data of a particular slice of the omni-directional image data. For example, in the embodiment depicted in FIG. 2, a slice descriptor $d_1$ is calculated for slice $S_1$, a slice descriptor $d_2$ is calculated for slice $S_2$, a slice descriptor $d_3$ is calculated for slice $S_3$, a slice descriptor $d_4$ is calculated for slice $S_4$, a slice descriptor $d_5$ is calculated for slice $S_5$, a slice descriptor $d_6$ is calculated for slice $S_6$, a slice descriptor $d_7$ is calculated for slice $S_7$, and a slice descriptor $d_8$ is calculated for slice $S_8$.

In some embodiments, the slice descriptor may be calculated at block 206 using an algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. However, it should be understood that other algorithms may be used to calculate the slice descriptor. In some embodiments, the slice descriptor may include a decimal vector. In some embodiments, the slice descriptor may include a binary vector. In other embodiments, the slice descriptor may be represented in a format other a binary vector or a decimal vector. In some embodiments that include two image capture devices 118, depth information resulting from the application of stereo algorithms may also be used to calculate the slice descriptor.

Still referring to FIGS. 1-2, at block 208, the machine readable instructions stored in the non-transitory memory component 114, when executed by the one or more processors 110, cause the omni-directional image data processing system 100 to generate a current sequence of slice descriptors for the omni-directional image data received at block 202. The current sequence of slice descriptors includes the calculated slice descriptor for each image slice of the plurality of image slices. For example, in the embodiment depicted in FIG. 2, node $n_1$ includes the slice descriptor $d_1$ corresponding to slice $S_1$, node $n_2$ includes the slice descriptor $d_2$ corresponding to slice $S_2$, node $n_3$ includes the slice descriptor $d_3$ corresponding to slice $S_3$, node $n_8$ includes the slice descriptor $d_8$ corresponding to slice $S_8$, etc.

In some embodiments, the current sequence of slice descriptors may be structured such that a middle node (e.g., node $n_2$ of FIG. 2) corresponds to a middle image slice (e.g., slice $S_2$ of FIG. 2), a preceding node (e.g., node $n_1$ of FIG. 2) corresponds to a preceding image slice (e.g., slice $S_1$ of FIG. 2), and a subsequent node (e.g., node $n_3$ of FIG. 2) corresponds to a subsequent image slice (e.g., slice $S_3$ of FIG. 2). The preceding node (e.g., node $n_1$ of FIG. 2) is linked to the middle node (e.g., node $n_2$ of FIG. 2), and the middle node (e.g., node $n_2$ of FIG. 2) is linked to the subsequent node (e.g., node $n_3$ of FIG. 2).

In some embodiments, the machine readable instructions stored in the non-transitory memory component 114, when executed by the one or more processors 110, cause the omni-directional image data processing system 100 to store the current sequence of slice descriptors in the data storage device 112. In some embodiments, the data storage device 112 may include a database of reference sequences of slice descriptors, each of which corresponds to a previously processed omni-directional image encountered by the omni-directional image data processing system 100.

In some embodiments, the current sequence of slice descriptors may be stored in the data storage device 112 as a current linked list of slice descriptors. In embodiments in which the current sequence of slice descriptors is stored in the data storage device 112 as a current linked list of slice descriptors, each node of the linked list may be linked to the subsequent node of the linked list (e.g., node $n_1$ is linked to node $n_2$, node $n_2$ is linked to node $n_3$, etc.). In some embodiments, the current sequence of slice descriptors may be stored in the data storage device 112 as a circular linked list of slice descriptors, such that the first node is linked to the second node (e.g., node $n_1$ is linked to node $n_2$), the second node is linked to the third node (e.g., node $n_2$ is linked to node $n_3$), . . . , and the last node is linked back to the first node (e.g., node $n_8$ is linked to node $n_1$). In some embodiments, the current sequence of slice descriptors may be stored in the data storage device 112 as a current doubly linked list of slice descriptors. It should be understood that in other embodiments, the current sequence of slice descriptors may be stored in the data storage device 112 using a data structure other than a linked list, such as an array, and the like.

Figure 3:
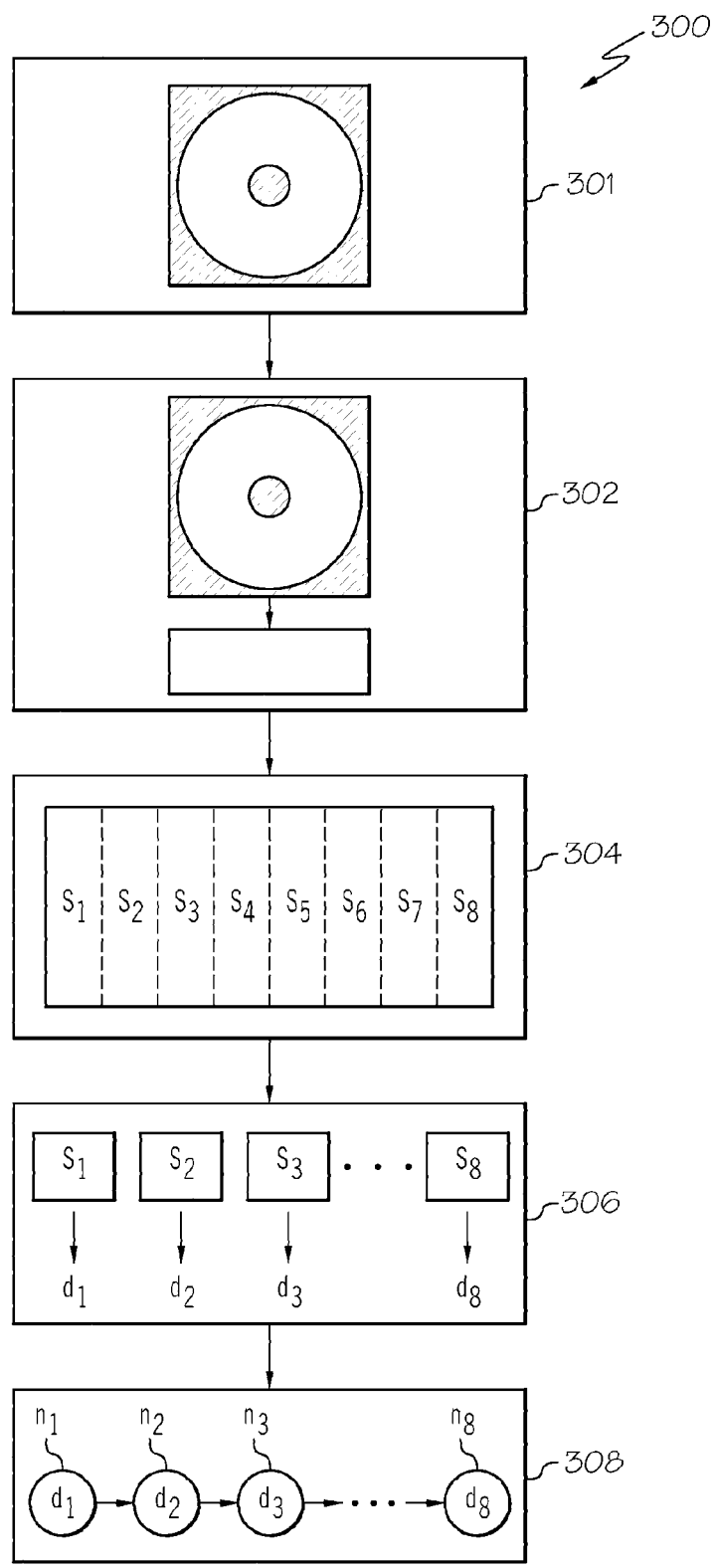
FIG. 3 schematically depicts a flowchart of a method of processing an unwarped omni-directional image, according to one or more embodiments shown and described herein.

While the omni-directional image received at block 202 was not unwarped prior to segmenting the omni-directional image at block 204 in the embodiment depicted in FIG. 2, in other embodiments, the omni-directional image may be unwarped prior to segmentation, such as in the embodiment depicted in FIG. 3.

Referring now to FIG. 3, a flowchart of a method 300 of unwarping and processing an omni-directional image is schematically depicted. In some embodiments, the method 300 may be implemented as logic within the machine readable instructions that, when executed by the one or more processors 110, automatically process omni-directional image data. It is noted that, while the method 300 depicts a specific sequence, additional embodiments of the present disclosure are not limited to any particular sequence.

Referring now to FIGS. 1 and 3, the omni-directional image is received at block 301, as described above with reference to block 202. At block 302, the machine readable instructions stored in the non-transitory memory component 114, when executed by the one or more processors 110, cause the omni-directional image data processing system 100 to unwarp the received omni-directional image data using any presently existing or to-be-developed unwarping algorithms.

Still referring to FIGS. 1 and 3, at block 304, the machine readable instructions stored in the non-transitory memory component 114, when executed by the one or more processors 110, cause the omni-directional image data processing system 100 to segment the unwarped omni-directional image data, as described above with reference to block 204.

Still referring to FIGS. 1 and 3, at block 306, the machine readable instructions stored in the non-transitory memory component 114, when executed by the one or more processors 110, cause the omni-directional image data processing system 100 to calculate a slice descriptor for each image slice of the plurality of image slices, as described above with reference to block 206.

Still referring to FIGS. 1 and 3, at block 308, the machine readable instructions stored in the non-transitory memory component 114, when executed by the one or more processors 110, cause the omni-directional image data processing system 100 to generate a current sequence of slice descriptors for the omni-directional image data received at block 301.

Figure 4:
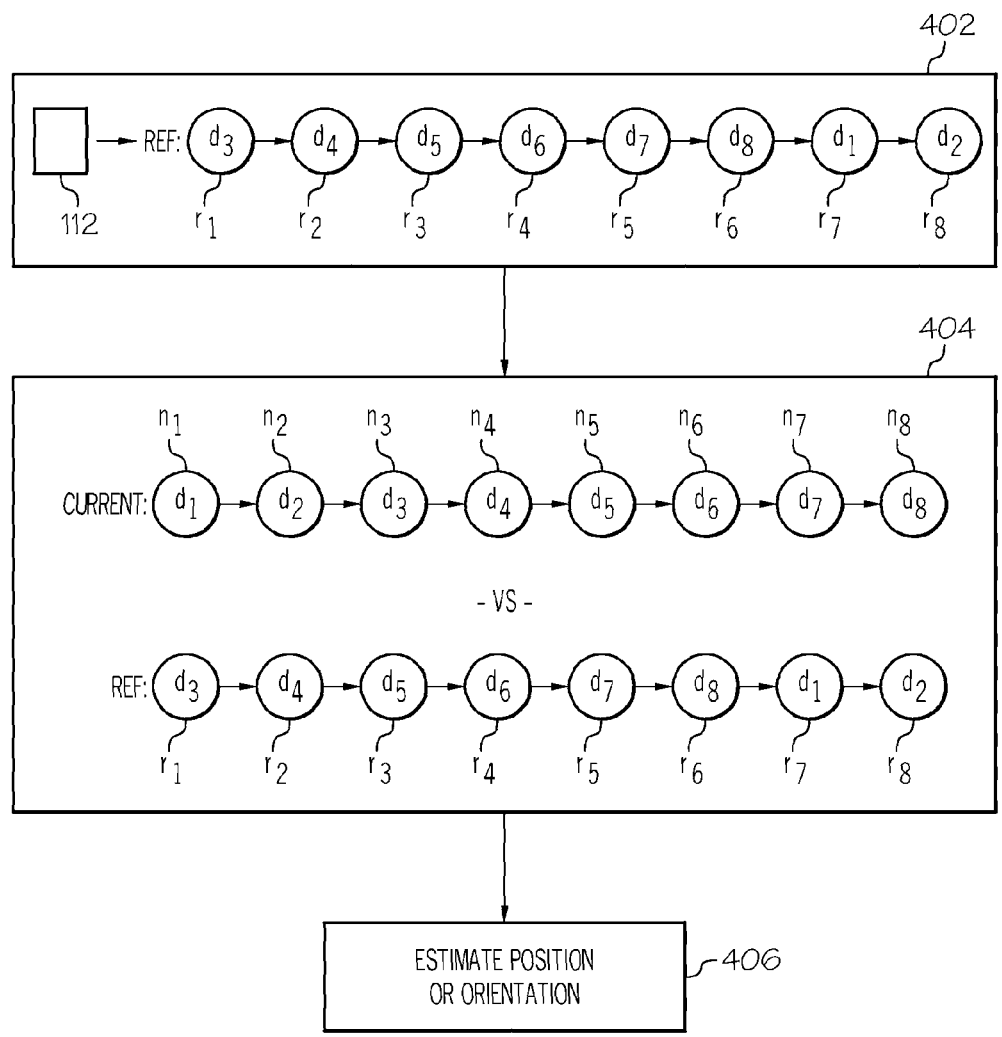
FIG. 4 schematically depicts a flowchart of a method of estimating a position or orientation based on a comparison between a current sequence of slice descriptors and a reference sequence of slice descriptors, according to one or more embodiments described and illustrated herein.

In some embodiments, after the current sequence of slice descriptors is generated at block 208 or block 308, the current sequence of slice descriptors may be compared to a reference sequence of slice descriptors stored in the data storage device 112 in order to estimate a position or an orientation of the one or more image capture devices 118, as illustrated in the flowchart of FIG. 4. In some embodiments, the one or more image capture devices 118 may be affixed to an object (e.g., a robot, a mobile device, a human, etc.), such that the current sequence of slice descriptors may be compared to a reference sequence of slice descriptors stored in the data storage device 112 in order to estimate a position or an orientation of the object to which the one or more image capture devices 118 are attached.

Referring now to FIG. 4, at block 402, the machine readable instructions stored in the non-transitory memory component 114, when executed by the one or more processors 110, may cause the omni-directional image data processing system 100 to access a reference sequence of slice descriptors in the data storage device 112. For example, in the embodiment depicted in FIG. 4, the reference sequence of slice descriptors includes a reference slice descriptor $d_3$ corresponding to a reference node $r_1$, a reference slice descriptor $d_4$ corresponding to a reference node $r_2$, a reference slice descriptor $d_5$ corresponding to a reference node $r_3$, a reference slice descriptor $d_6$ corresponding to a reference node $r_4$, a reference slice descriptor $d_7$ corresponding to a reference node $r_5$, a reference slice descriptor $d_8$ corresponding to a reference node $r_6$, a reference slice descriptor $d_1$ corresponding to a reference node $r_7$, a reference slice descriptor $d_2$ corresponding to a reference node $r_8$.

Still referring to FIG. 4, at block 404, the machine readable instructions stored in the non-transitory memory component 114, when executed by the one or more processors 110, may cause the omni-directional image data processing system 100 to determine whether the current sequence of slice descriptors matches the reference sequence. In some embodiments, whether the current sequence of slice descriptors matches the reference sequence of slice descriptors is determined by determining a current order of slice descriptors, determining a reference order of slice descriptors, and comparing the current order of slice descriptors to the reference order of slice descriptors. For example, a current order of slice descriptors in the embodiment depicted in FIG. 4 may be determined as $\{d_1, d_2, d_3, d_4, d_5, d_6, d_7, d_8\}$. A reference order of slice descriptors in the embodiment depicted in FIG. 4 may be determined as $\{d_3, d_4, d_5, d_6, d_7, d_8, d_1, d_2\}$. The current order of slice descriptors $\{d_1, d_2, d_3, d_4, d_5, d_6, d_7, d_8\}$ may be compared to the reference order of slice descriptors $\{d_3, d_4, d_5, d_6, d_7, d_8, d_1, d_2\}$ in order to determine whether the current order of slice descriptors matches the reference order of slice descriptors.

In some embodiments, the current sequence of slice descriptors is a current circular linked list of slice descriptors and the reference sequence of slice descriptors is a reference circular linked list of slice descriptors. In such embodiments, the current order of slice descriptors may be determined by traversing the current circular linked list of slice descriptors starting at a current starting node (e.g., the current order of slice descriptors may be determined to be $\{d_1, d_2, d_3, d_4, d_5, d_6, d_7, d_8\}$ by traversing the current circular linked list starting from node $n_1$ of the current circular linked list of slice descriptors). The reference order of slice descriptors may be determined by traversing the reference circular linked list of slice descriptors starting at a reference starting node (e.g., the reference order of slice descriptors may also be determined to be $\{d_1, d_2, d_3, d_4, d_5, d_6, d_7, d_8\}$ by traversing the reference circular linked list starting from node $r_7$ of the reference circular linked list of slice descriptors). The current sequence of slice descriptors matches the reference sequence of slice descriptors when the current order of slice descriptors is the same as the reference order of slice descriptors. In the embodiment depicted in FIG. 4, the current sequence of slice descriptors may be determined to match the reference sequence of slice descriptors because the reference order of slice descriptors when traversing the reference circular linked list of slice descriptors starting from node $r_7$ is the same as the current order of slice descriptors when traversing the current circular linked list of slice descriptors starting from node $n_1$.

Still referring to FIG. 4, at block 406, the machine readable instructions stored in the non-transitory memory component 114, when executed by the one or more processors 110, may cause the omni-directional image data processing system 100 to estimate an orientation or position based on the current sequence of slice descriptors and the reference sequence of slice descriptors. For example, differences between the current sequence of slice descriptors and the reference sequence of slice descriptors may be used to determine a current position or orientation with reference to a known position or orientation associated with the reference sequence of slice descriptors. In some embodiments, standard filtering techniques, such as the extended Kalman filter, the particle filter, and the like may be used to determine the current position or orientation based on the comparison between the current sequence of slice descriptors and the reference sequence of slice descriptors.

It should now be understood that segmenting an omni-directional image into a plurality of image slices, calculating a slice descriptor for each slice, and generating a sequence of slice descriptors to represent the omni-directional image data, as described herein, may provide for scalable, compact, and efficient representations of omni-directional image data. Such scalable, compact, and efficient representations of omni-directional image data may facilitate fast and efficient estimation of position or orientation that only involves comparing a current sequence of slice descriptors with a current sequence of slice descriptors. Such scalable, compact, and efficient representations of omni-directional image data may facilitate fast and efficient estimation of the current position or orientation of robots or other devices that include omni-directional image capture devices. Accordingly, the embodiments described herein may reduce processing and data storage requirements. The scalable, compact, and efficient representations of omni-directional image data may be useful in real-time omni-directional image processing systems that process large amounts of data, such as in real-time high-definition omni-directional image processing systems.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for processing omni-directional image data comprising:
   receiving omni-directional image data, wherein the omni-directional image data is representative of a panoramic field of view;
   segmenting, by one or more processors, the omni-directional image data into a plurality of image slices, wherein each image slice of the plurality of image slices is representative of at least a portion of the panoramic field of view of the omni-directional image data;
   calculating a slice descriptor for each image slice of the plurality of image slices;
   generating a current sequence of slice descriptors, wherein the current sequence of slice descriptors includes the calculated slice descriptor for each image slice of the plurality of image slices;
   accessing a reference sequence of slice descriptors in a data storage device;
   determining whether the current sequence of slice descriptors matches the reference sequence of slice descriptors;
   determining a difference between the current sequence of slice descriptors and the reference sequence of slice descriptors in response to the current sequence of slice descriptors not matching the reference sequence of slice descriptors; and determining a current orientation based on the difference and a known orientation associated with the reference sequence, wherein determining whether the current sequence of slice descriptors matches the reference sequence of slice descriptors comprises determining whether an order of the reference sequence of slice descriptors matches an order of the current sequence of slice descriptors.

2. The method of claim 1, further comprising storing the generated current sequence in a data storage device.

3. The method of claim 1, wherein whether the current sequence of slice descriptors matches the reference sequence of slice descriptors is determined by:

determining a current order of slice descriptors;
determining a reference order of slice descriptors; and
comparing the current order of slice descriptors to the reference order of slice descriptors.

4. The method of claim 3, wherein the current sequence of slice descriptors is a current circular linked list of slice descriptors and the reference sequence of slice descriptors is a reference circular linked list of slice descriptors, wherein:

the current order of slice descriptors is determined by traversing the current circular linked list of slice descriptors starting at a current starting node;

the reference order of slice descriptors is determined by traversing the reference circular linked list of slice descriptors starting at a reference starting node; and the current sequence of slice descriptors matches the reference sequence of slice descriptors when the current order of slice descriptors is the same as the reference order of slice descriptors.

5. The method of claim 1, further comprising when the current sequence of slice descriptors matches the reference sequence of slice descriptors, estimating an orientation of an object including one or more image capture devices based on the current sequence of slice descriptors and the reference sequence of slice descriptors.

6. The method of claim 1, further comprising when the current sequence of slice descriptors matches the reference sequence of slice descriptors, estimating a position of an object including one or more image capture devices based on the current sequence of slice descriptors and the reference sequence of slice descriptors.

7. The method of claim 1, further comprising unwarping the received omni-directional image data, wherein the unwarped omni-directional image data is segmented into the plurality of image slices.

8. The method of claim 1, wherein:

the plurality of image slices includes a middle image slice, a preceding image slice, and a subsequent image slice, wherein a middle field of view of the middle image slice is adjacent a preceding field of view of the preceding image slice and the middle field of view of the middle image slice is adjacent to a subsequent view of the subsequent image slice; and the current sequence of slice descriptors includes a preceding node corresponding to the preceding image slice, a middle node corresponding to the middle image slice, and a subsequent node corresponding to the subsequent image slice, wherein the preceding node is linked to the middle node and the middle node is linked to the subsequent node.

9. The method of claim 1, wherein a number of the plurality of image slices is between 8 and 36.

10. The method of claim 1, wherein each image slice of the plurality of image slices is representative of an equal portion of the panoramic field of view of the omni-directional image data and the collective fields of view of the plurality of image slices is the same as the panoramic field of view of the omni-directional image data.

11. The method of claim 1, wherein the slice descriptor includes a decimal vector.

12. The method of claim 1, wherein the slice descriptor includes a binary vector.

13. The method of claim 1, wherein the slice descriptor is calculated using an algorithm selected from the group consisting of: scale-invariant feature transform, speeded up robust feature, histogram of oriented gradients, generalized search tree, fast retina keypoint, binary robust invariant scalable keypoints, and stereo algorithms.

14. An omni-directional image data processing system comprising:

one or more processors;
a non-transitory memory component communicatively coupled to the one or more processors;
a data storage device; and
machine readable instructions stored in the non-transitory memory component that cause the omni-directional image data processing system to perform at least the following when executed by the one or more processors:

receive omni-directional image data, wherein the omni-directional image data is representative of a panoramic field of view;

segment the omni-directional image data into a plurality of image slices, wherein each image slice of the plurality of image slices is representative of at least a portion of the panoramic field of view of the omni-directional image data;

calculate a slice descriptor for each image slice of the plurality of image slices;

generate a current sequence of slice descriptors, wherein the current sequence of slice descriptors includes the calculated slice descriptor for each image slice of the plurality of image slices;

access a reference sequence of slice descriptors in the data storage device;

determine whether the current sequence of slice descriptors matches the reference sequence of slice descriptors;

determine a difference between the current sequence of slice descriptors and the reference sequence of slice descriptors in response to the current sequence of slice descriptors not matching the reference sequence of slice descriptors; and determine a current orientation based on the difference and a known orientation associated with the reference sequence, wherein whether the current sequence of slice descriptors matches the reference sequence of slice descriptors is determined by determining whether an order of the reference sequence of slice descriptors matches an order of the current sequence of slice descriptors.

15. The omni-directional image data processing system of claim 14, further comprising one or more image capture devices, wherein the omni-directional image data is received from the one or more image capture devices.

16. The omni-directional image data processing system of claim 14, wherein the machine readable instructions stored in the non-transitory memory component further cause the omni-directional image data processing system to perform at least the following when executed by the one or more processors:
  determine a current order of slice descriptors;
  determine a reference order of slice descriptors; and
  compare the current order of slice descriptors to the reference order of slice descriptors.

17. A robot comprising:
  one or more processors;
  one or more image capture devices communicatively coupled to the one or more processors;
  a non-transitory memory component communicatively coupled to the one or more processors;
  a data storage device; and
  machine readable instructions stored in the non-transitory memory component that cause the robot to perform at least the following when executed by the one or more processors:
    receive omni-directional image data from the one or more image capture devices, wherein the omni-directional image data is representative of a panoramic field of view;
    segment the omni-directional image data into a plurality of image slices, wherein each image slice of the plurality of image slices is representative of at least a portion of the panoramic field of view of the omni-directional image data;
    calculate a slice descriptor for each image slice of the plurality of image slices;
    generate a current sequence of slice descriptors, wherein the current sequence of slice descriptors includes the calculated slice descriptor for each image slice of the plurality of image slices;
    access a reference sequence of slice descriptors in the data storage device;
    determine whether the current sequence of slice descriptors matches the reference sequence of slice descriptors;
    determine a difference between the current sequence of slice descriptors and the reference sequence of slice descriptors in response to the current sequence of slice descriptors not matching the reference sequence of slice descriptors; and
    determine a current orientation based on the difference and a known orientation associated with the reference sequence,
    wherein whether the current sequence of slice descriptors matches the reference sequence of slice descriptors is determined by determining whether an order of the reference sequence of slice descriptors matches an order of the current sequence of slice descriptors.

18. The omni-directional image data processing system of claim 16, wherein the current sequence of slice descriptors is a current circular linked list of slice descriptors and the reference sequence of slice descriptors is a reference circular linked list of slice descriptors, wherein:
  the current order of slice descriptors is determined by traversing the current circular linked list of slice descriptors starting at a current starting node;
  the reference order of slice descriptors is determined by traversing the reference circular linked list of slice descriptors starting at a reference starting node; and
  the current sequence of slice descriptors matches the reference sequence of slice descriptors when the current order of slice descriptors is the same as the reference order of slice descriptors.

19. The robot of claim 17, wherein whether the current sequence of slice descriptors matches the reference sequence of slice descriptors is determined by:
  determining a current order of slice descriptors;
  determining a reference order of slice descriptors; and
  comparing the current order of slice descriptors to the reference order of slice descriptors.

20. The robot of claim 19, wherein the current sequence of slice descriptors is a current circular linked list of slice descriptors and the reference sequence of slice descriptors is a reference circular linked list of slice descriptors, wherein:
  the current order of slice descriptors is determined by traversing the current circular linked list of slice descriptors starting at a current starting node;
  the reference order of slice descriptors is determined by traversing the reference circular linked list of slice descriptors starting at a reference starting node; and
  the current sequence of slice descriptors matches the reference sequence of slice descriptors when the current order of slice descriptors is the same as the reference order of slice descriptors.

* * * * *